US008803999B2

(12) United States Patent  
Wilson et al.

(10) Patent No.: US 8,803,999 B2  
(45) Date of Patent: Aug. 12, 2014

(54) METHOD AND APPARATUS FOR IMAGE ORIENTATION INDICATION AND CORRECTION

(75) Inventors: Kelce Steven Wilson, Murphy, TX (US); Shalini Suresh Periyalwar, Waterloo (CA)

(73) Assignee: BlackBerry Limited, Waterloo (CA)

( * ) Notice: Subject to any disclaimer, the term of this patent is extended or adjusted under 35 U.S.C. 154(b) by 302 days.

(21) Appl. No.: 13/270,465

(22) Filed: Oct. 11, 2011

(65) Prior Publication Data

US 2012/0086819 A1  Apr. 12, 2012

Related U.S. Application Data

(60) Provisional application No. 61/392,355, filed on Oct. 12, 2010.

(51) Int. Cl.  
*H04N 5/228* (2006.01)

(52) U.S. Cl.  
USPC .................. 348/222.1; 348/14.01; 348/14.02; 348/333.06; 348/583

(58) Field of Classification Search  
USPC ............ 348/222.1, 14.01, 14.02, 333.06, 583  
See application file for complete search history.

(56) References Cited

U.S. PATENT DOCUMENTS

2001/0008412 A1  7/2001  Ando et al.  
2011/0249086 A1*  10/2011  Guo et al. .................. 348/14.12

FOREIGN PATENT DOCUMENTS

EP   1126709 A1   8/2001  
WO   2008/001441 A1   1/2008

OTHER PUBLICATIONS

"DroidForums.net ; Incorrect Picture Orientation in MMS Message,", http://www.droidforums.net/forum/tech-issues-bug-reports-suggestions/29495-incorrectpicture- orientation-mms-message.html, Mar. 13, 2010.  
Clemens, A , "New 'Auto-Correction-Mode' for the Free Rotation Image Plugin, DIGIKAM.org,", http://www.digikam.org/drupal/node/445. ; May 6, 2009.  
Janssen, S. ; "CocoViewX MAC OS X Picture Viewer", http://web.archive.org/web/20100808102836/http://www.stalkingwolf.net/software/cocovie wx/ ; Aug. 8, 2010, pp. 1-6, last updated Jan. 6, 2007.  
Luo, Jiebo ; "Synthetic DNA delivery systems,", Nature Biotechnology, 2000.18: 33-37.  
Nikon ; "How to rotate D2H/D70 Images to the Correct Orientation Automatically,",http://help.nikon.ca/app/answers/detail/a_id/10670/~/how-to-rotate-d2h-%2F-d70-images-tothe- correct-orientation-automatically ; published Jul. 15, 2004, updated Nov. 24, 2004.  
Office Action mailed Nov. 8, 2013, in corresponding Canadian patent application No. 2,754,841.

* cited by examiner

*Primary Examiner* — Yogesh Aggarwal  
(74) *Attorney, Agent, or Firm* — Novak Druce Connolly Bove + Quigg LLP (57) ABSTRACT

Tilt imparted to video images captured by a handheld electronic communication device is identified and corrected by the disclosed method and apparatus for image orientation. The handheld device includes image capturing capability and an orientation sensor, which provides a signal representative of orientation relative to gravity to calculate an angle of rotation for the captured images suitable to compensate a difference between the orientation of the handheld device and the orientation relative to gravity. The handheld device also includes a receiver wherein the angle of rotation is recovered and used to determine the changes needed substantially eliminate the difference between the orientation of the captured images and the orientation relative to gravity.

11 Claims, 6 Drawing Sheets

METHOD AND APPARATUS FOR IMAGE ORIENTATION INDICATION AND CORRECTION

CROSS-REFERENCE OF RELATED APPLICATION

The present application claims priority to U.S. Provisional Application Ser. No. 61/392,355 filed on Oct. 12, 2010, the content of which is incorporated herein by reference in its entirety.

The present disclosure is related to the correction of images captured by a first device and displayed on a display of a second device, and more particularly related to the identification and correction of tilt imparted to video images captured by a handheld electronic communication device and communicated to and subsequently displayed on a display of another device.

DETAILED DESCRIPTION

The present disclosure is directed to the solution of having unnaturally tilted images appearing in the display of handheld electronic communication devices. Accordingly, one aspect of a solution is to provide a handheld communication device having image capturing capability and an orientation sensor. The handheld device includes a processor with its associated memory and the image capturing device mounted in a known orientation and providing an electronic representation of a visible scene. The orientation sensor provides a signal representative of orientation relative to gravity so that the known orientation of the electronic representation and the signal representative of orientation relative to gravity are used by the processor to calculate an angle of rotation for the electronic representation of the visible scene suitable to compensate a difference between the known orientation of the electronic representation and the signal representative of orientation relative to gravity. A receiver receives the electronic representation of the visible scene and the signal representative of orientation relative to gravity. The processor recovers the angle of rotation and determines the changes needed to the visible scene to rotate the visible scene and substantially eliminate the difference between the known orientation of the electronic representation and the signal representative of orientation relative to gravity to create a second image. A display displays the second image.

Figure 1A:
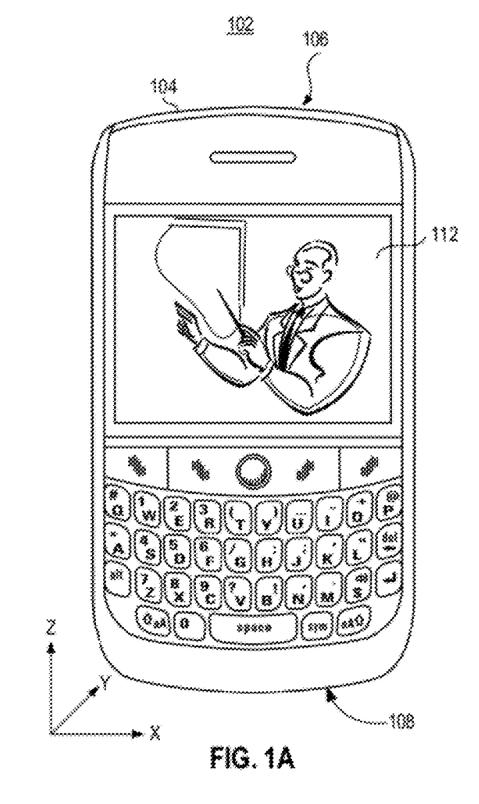
FIG. 1A is a view of the front face of a handheld electronic communication device that may employ the present disclosure.
Figure 1B:
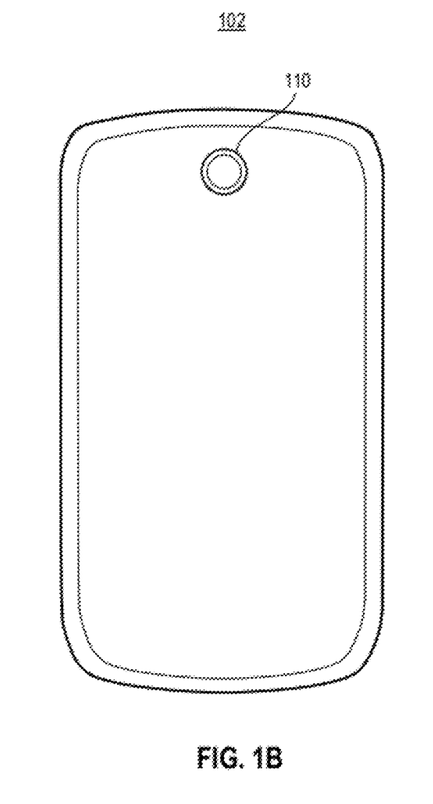
FIG. 1B is a view of the back face of a handheld communication electronic device that may employ the present disclosure.

FIG. 1A and FIG. 1B illustrate front and back views of exemplary handheld electronic device 102 in which implementations of the present disclosure may be applied. Electronic device 102 is a handheld electronic device having two-way communication capabilities such as, for example, data communication capabilities, enhanced voice communication capabilities such as with coordinated video in a videoconference mode, or the capability to communicate with other computer systems, for example, via the Internet. The handheld electronic device 102 includes a rigid housing 104 for enclosing its operational components. The rigid housing 104 is configured to be held in a user's hand while the handheld electronic device 102 is in use. In the implementation shown in FIGS. 1A and 1B, the housing 104 is generally elongate, having a length greater than its width, and a thickness less than either of the other dimensions. The housing 104 has opposed top and bottom ends designated by references 106 and 108 respectively, and a front and a back shown respectively in the views of FIG. 1A and FIG. 1B. Although the housing 104 is shown as a single unit, it could, among other possible configurations, include two or more case members hinged together (such as, for example, a flip-phone configuration or a clam shell-style laptop computer). Disposed on the back of the housing 104 of the handheld electronic device 102 is an aperture 110 through which an image capturing device, a camera such as a still camera or a video camera, accesses the environment and captures a scene such as that depicted on a display 112 located on the front of the handheld electronic device 102. The display 112 is illustrated as being of a square aspect ratio and located at the top 106 of the handheld device 102. However, implementation of the display in various implementations is dependent upon the marketplace. A rectangular aspect ratio is a well known variation and provides a more suitable presentation of "landscape" modes of images and text pages. A rectangular display can be disposed on the handheld device in a configuration rotated 90° from that depicted in FIG. 1A and can be fixed, movable, or slidable from a given position.

Figure 2:
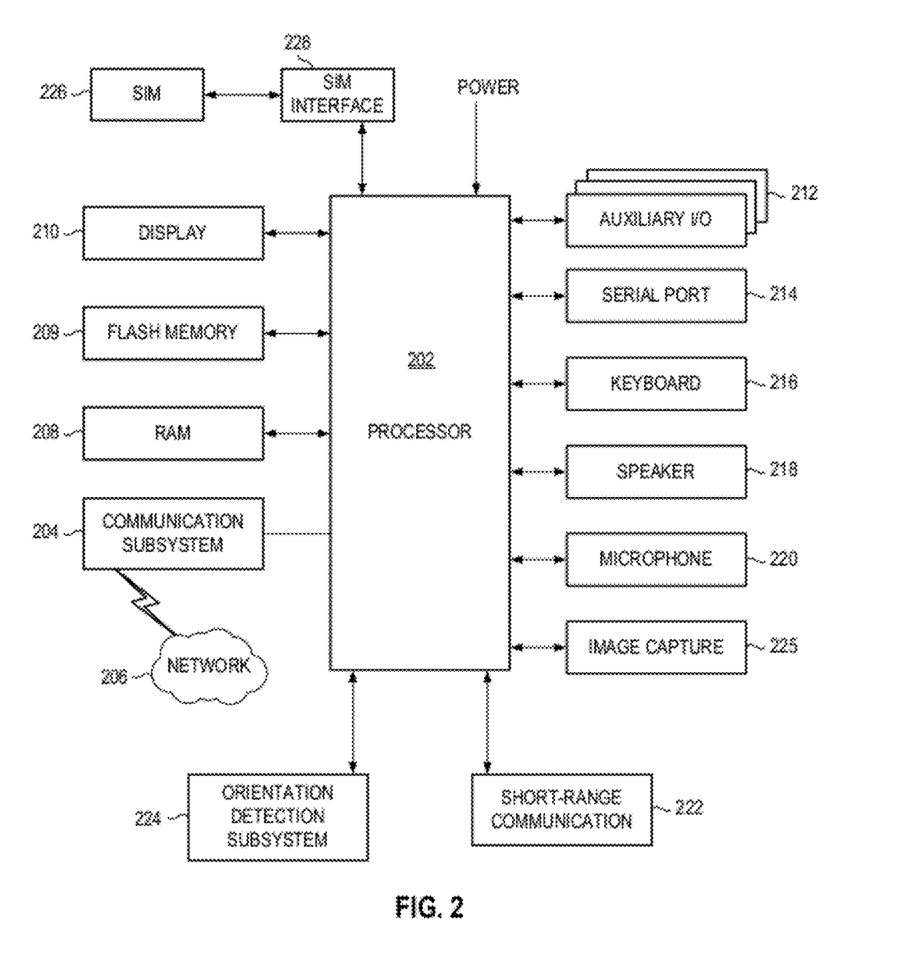
FIG. 2 is a block diagram of the major electronic functions of a handheld electronic communication device that may employ the present disclosure.

Referring next to FIG. 2, a block diagram of the handheld electronic device 102 is shown generally as 200. Handheld electronic device 102 comprises a number of components, the controlling component being processor 202. Processor 202 is implemented as one or more microprocessor devices arranged to process inputs and software code instructions to further the performance of the handheld device tasks. Thus, processor 202 controls the overall operation of handheld electronic device 102. Communication functions, including data, voice, and image communications, are performed through communication subsystem 204. Communication subsystem 204 receives messages from and sends messages to a wireless network 206. Implementation of a communication subsystem 204 may be configured in accordance with the Global System for Mobile Communication (GSM) and General Packet Radio Services (GPRS) standards, or standards such as Enhanced Data GSM Environment (EDGE), Universal Mobile Telecommunications Service (UMTS), or Ultra Mobile Broadband (UMB), etc. New standards continue to be defined and are expected to have similarities to the network behavior of the foregoing systems, and it is understood that persons skilled in the art know that the implementations described herein are intended to use any other suitable standards that are developed in the future. The wireless link connecting communication subsystem 204 with network 206 represents one or more different radio frequency (RF) channels, operating according to defined protocols specified for the communication standards mentioned above. With newer network protocols, these channels are capable of supporting both circuit switched voice communications and packet switched data communications.

The different types of wireless networks that may be employed can generally be considered to be data-centric wireless networks, human-centric wireless networks, and dual-mode networks that can support voice, image, and data communications over the same physical base stations. Combined dual-mode networks include, but are not limited to, Code Division Multiple Access (CDMA) or CDMA2000 networks, GSM/GPRS networks (as mentioned above), third-generation (3G) networks like EDGE and UMTS, or future networks.

Processor 202 further interacts with additional subsystems such as a Random Access Memory (RAM) 208, flash memory 209, display 210, auxiliary input/output (I/O) subsystem 212, serial port 214, keyboard 216, speaker 218, microphone 220, short-range communications subsystem 222, orientation detection subsystem 224, image capture device 225, and other device subsystems.

Figure 5:
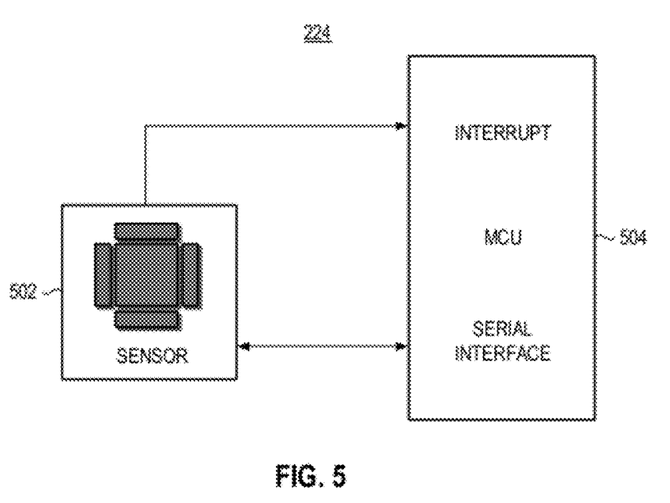
FIG. 5 is a block diagram of the major electronic functions of the orientation detection subsystem that may be employed in the handheld electronic communication device of FIG. 2.

Referring briefly to FIG. 5, the orientation detection subsystem 224 comprises a sensor, for example an accelerometer 502, coupled to the interrupt and serial interface of a controller (MCU) 504. In one implementation, the functions of controller 504 are subsumed in the processor 202 of the device 102. Nevertheless, the operation of the controller 504 is controlled by software, which may be stored in memory, including internal memory of the controller 504. The operational settings of the accelerometer 502 are controlled by the controller 504 using control signals sent from the controller 504 to the accelerometer 502 via a serial interface. The controller 504 analyzes the detected orientation in accordance with the acceleration measured by the accelerometer 502. In other implementations, a different accelerometer configuration could be used, for example, a suitable analog accelerometer and control circuit could be used. The accelerometer has a sensing element that detects acceleration from motion and gravity, and generates and outputs an electrical signal representative of the detected acceleration. Changes in orientation of handheld electronic device 102 result in relative changes in the gravity acceleration vector with respect to the housing of the handheld electronic device 102, most significantly changes between the Z and X axes of the housing (i.e., the front and back face of the housing) and the angle the gravity acceleration vector makes with these axes. The change produces corresponding changes in the electrical signal output. Conventional accelerometers have one, two, or three sensing axes. Generally, two types of outputs are available depending on whether an analog or digital accelerometer is used: an analog output using buffering and analog-to-digital (A/D) conversion, or a digital output which is typically available in an industry standard interface such as an SPI (Serial Peripheral Interface) or $I^2C$ (Inter-Integrated Circuit) interface. The output of an accelerometer is typically measured in terms of the gravitational acceleration constant at the Earth's surface, g. Exemplary low-g accelerometers which may be used in handheld devices are MEMS digital accelerometers from Analog Devices, Inc., Freescale Semiconductor, Inc., and STMicroelectronics N.V. An analog accelerometer, model LIS3344AL, is an analog accelerometer available from STMicroelectronics N.V., with an output data rate of up to 2 kHz which has been shown to have good response characteristics in analog sensor based acceleration detection subsystems.

Returning to FIG. 2, processor 202 is also coupled to an image capture device 225, a digital camera in one implementation which is capable of transducing light into electrical signals representing either still images or video compatible with conventional video standards. Components of the image capture device 225 are integrated into handheld electronic device 102, although some or all of the components of the digital camera may be physically separated from, but coupled to, handheld electronic device 102 in variant implementations. Components of the image capture device 225 typically comprise a lens and one or more image sensors, as well as other components, as is known in the art. When image capture device 225 is activated, by entering a digital camera mode with a user activation of a pushbutton on the face of the handheld electronic device 102, for example, image capture device 225 is configured to capture images in known manner. Captured images can be, for example, stored as image files in one or more memories (e.g. temporarily in RAM 208 or more persistently in flash memory 209 or some other memory) on or coupled to the handheld electronic device 102, viewed on display 112, 210, and/or transmitted as concatenated image files (video) over network 206 to a remote device.

Some of the subsystems of handheld electronic device 102 perform communication-related functions, whereas other subsystems may provide "resident" or on-device functions. By way of example, display 112, 210 and keyboard 216 may be used for both communication-related functions, such as entering a text message for transmission over network 206, and device-resident functions such as a calculator or task list. Operating system software used by processor 202 is typically stored in a persistent store such as flash memory 209, which may alternatively be a read-only memory (ROM) or similar storage element. Those skilled in the art will appreciate that the operating system, specific device applications, or parts thereof, may be temporarily loaded into a volatile store such as RAM 208.

Handheld electronic device 102 may send and receive communication signals over network 206 after required network registration or activation procedures have been completed. Network access is associated with a subscriber or user of a handheld electronic device 102. To identify a subscriber, handheld electronic device 102 may provide for a Subscriber Identity Module or "SIM" card 226 to be inserted in a SIM interface 228 in order to communicate with a network. SIM 226 is one type of a conventional "smart card" used to identify a subscriber of handheld electronic device 102 and to personalize the handheld electronic device 102, among other things.

In use, a received signal including a text message, an e-mail message, videoconference participation, or web page download is processed by communication subsystem 204 and input to processor 202. Processor 202 then processes the received signal for output to display 112, 210 or alternatively to auxiliary I/O subsystem 212. A subscriber may also compose data items, such as e-mail messages, for example, using keyboard 216 in conjunction with display 112, 210 and possibly auxiliary I/O subsystem 212. Auxiliary subsystem 212 may include devices such as: a touch screen, mouse, track ball, infrared fingerprint detector, or a roller wheel with dynamic button pressing capability. Keyboard 216 may comprise an alphanumeric keyboard and/or telephone-type keypad. A composed item may be transmitted over network 206 through communication subsystem 204.

For voice communications, the overall operation of handheld electronic device 102 is substantially similar, except that the received signals may be processed and output to speaker 218, and signals for transmission may be generated by microphone 220. Alternative voice or audio I/O subsystems, such as a voice message recording subsystem, may also be implemented on handheld electronic device 102. Although voice or audio signal output is accomplished primarily through speaker 218, display 112, 210 may also be used to provide additional information such as the identity of a calling party, duration of a voice call, or other voice call related information. Coordination of electronic video images from image capture device 225 and audio signals from microphone 220 is undertaken by processor 202 as part of a videoconference application. Additionally, videoconferencing signals received by communication subsystem 204 are processed by processor 202 into audio signals and video signals provided to speaker 218 and display 210, 112.

Figure 3:
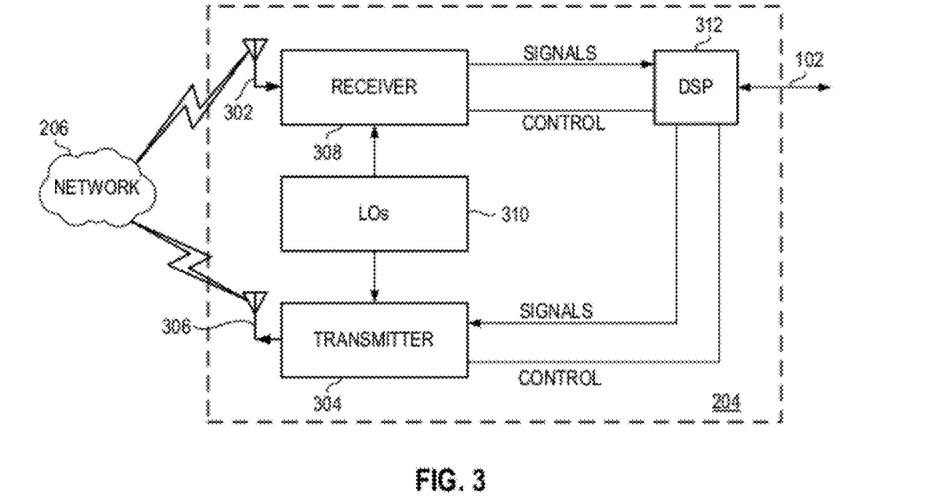
FIG. 3 is a block diagram of the major electronic functions of a communication subsystem that may be employed in the handheld electronic communication device of FIG. 2.

Referring now to FIG. 3, a block diagram of the communication subsystem component 204 of FIG. 2 is shown. Communication subsystem 204 comprises a radio receiver 308, a radio transmitter 304, one or more embedded or internal antenna elements 306, 302, one or more local oscillators (LOs) 310, and a signal processing module such as a digital signal processor (DSP) 312. The particular design of communication subsystem 204 is dependent upon the network 206 in which handheld electronic device 102 is intended to operate; thus, it should be understood that the design illustrated in FIG. 3 serves only as one example. Signals received by antenna 302 via network 206 are input to receiver 308, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 312. In a similar manner, signals to be transmitted are processed, including modulation and encoding, by DSP 312. These DSP-processed signals are input to transmitter 304 for digital-to-analog (D/A) conversion, frequency up conversion, filtering, amplification and transmission over network 206 via antenna 306. DSP 312 not only processes communication signals, but also provides for receiver and transmitter control. For example, gain applied to communication signals in receiver 308 and transmitter 304 may be adaptively controlled through automatic gain control algorithms implemented in DSP 312.

The wireless link between handheld electronic device 102 and a network 206 may contain one or more different channels, typically different radio frequency (RF) channels, and associated protocols used between handheld electronic device 102 and network 206. A RF channel is a limited resource, typically due to limits in overall bandwidth and limited battery power of handheld electronic device 102.

Figure 4:
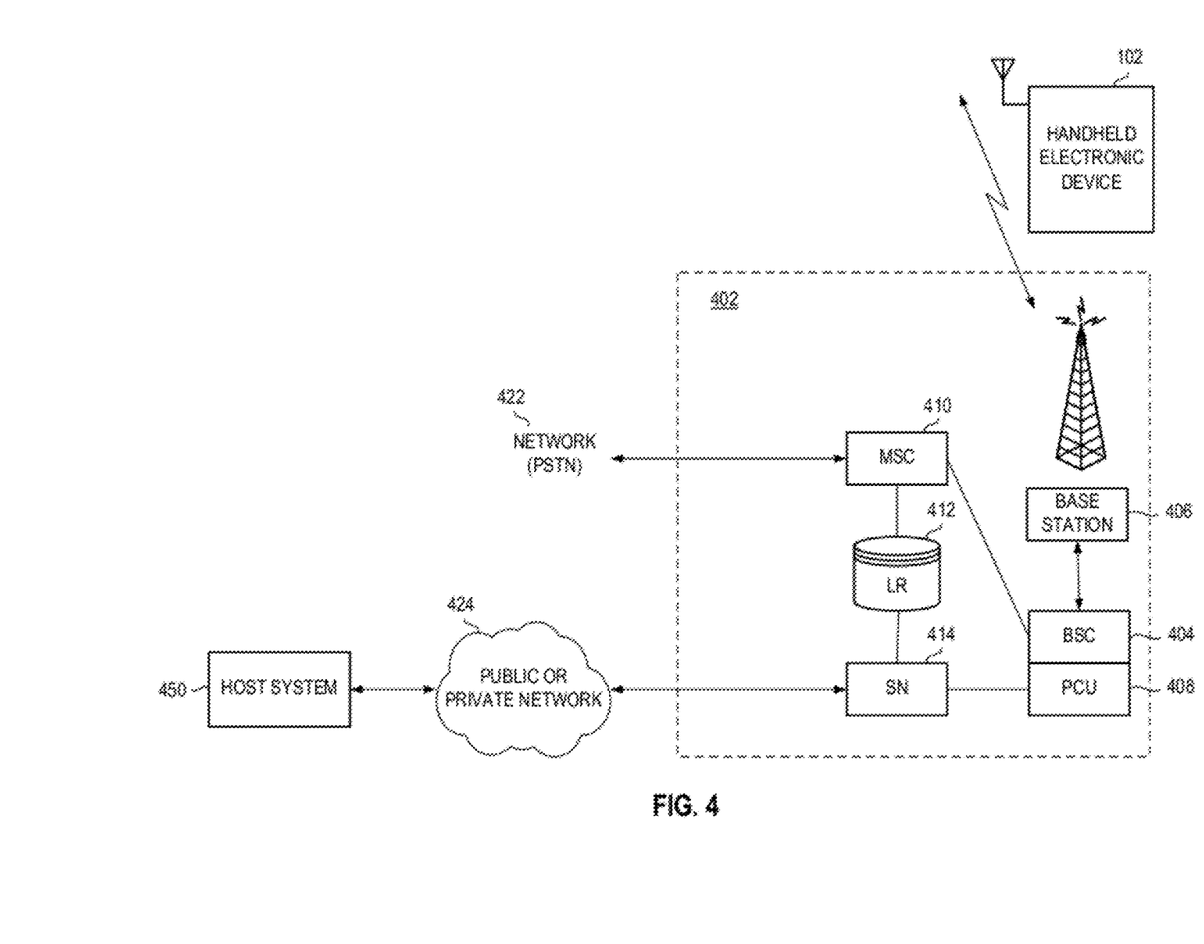
FIG. 4 is a block diagram of the major electronic functions of a network that may be employed in the present disclosure.

Referring now to FIG. 4, a block diagram of one node of wireless network 206 is shown as node 402. Handheld electronic device 102 communicates with node 402. In operation, node 402 is configured in accordance with one of the communication standards existent for communications. Node 402 typically includes a base station controller (BSC) 404 with an associated base station 406 for transmission and reception of radio signals from the handheld electronic device 102, a Packet Control Unit (PCU) 408, a Mobile Switching Center (MSC) 410, a Location Register (LR) 412, and a Support Node (SN) 414. Of course, the indication of components is not meant to be an exhaustive list of the components of every node 402 within a network.

Typically, MSC 410 is coupled to BSC 404 for communications on a radio resource and to a landline network, such as a Public Switched Telephone Network (PSTN) 422 to satisfy circuit switched requirements. The connection through PCU 408 and SN 414 is to a public or private network (Internet) 424. Registration and location information related to the handheld device is under the control of the location register 412.

Base station 406 is a fixed transceiver station and, together with BSC 404, forms the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 406. The fixed transceiver equipment normally performs such functions as modulation and possibly encoding and/or encryption of signals to be transmitted to the mobile device in accordance with particular communication protocols and parameters, under control of its controller. The fixed transceiver equipment similarly demodulates and possibly decodes and decrypts, if necessary, any communication signals received from handheld electronic device 102 within its cell. Communication protocols and parameters may vary between different nodes. For example, one node may employ a different modulation scheme and operate at different frequencies than other nodes.

A device which is likely the recipient of image signals generated by the handheld electronic device 102 is a videoconference-equipped desktop computer 602 or a videoconference device 604 particularly designed for videoconferencing operation. These devices are known to be coupled to the host system 450 in at least one of a plurality of techniques and transmit and receive videoconference content via the public or private network 424.

A three axis coordinate system can be established for the handheld electronic device 102, as shown in FIG. 1A. The X axis corresponds with right and left translations of the handheld electronic device 102. The Z axis corresponds with top and bottom translations of the handheld electronic device 102. And the Y axis, shown into the plane of the sheet being viewed, corresponds with translations toward and away from a scene being captured by the image capture device 225 when the image capture aperture 110 is disposed on the back of the handheld electronic device 102. Of course, the aperture can be placed on any of the surfaces of the handheld electronic device 102 depending upon the objectives of the device designer and any physical limitations of the handheld electronic device 102, itself. In any event, it can be readily understood that rotations about the Z axis are shifts of the scene to the left and right—scene compositions that are at the option of the user. Rotations about the X axis are shifts of the scene up or down and, again, are scene compositions at the option of the user. Rotations about the Y axis are arguably more troublesome, as such rotations affect the appearance of what is a level surface in the scene. The scene shown in the display 112 of the handheld electronic device 102 of FIG. 1A appears normal and properly level.

When the handheld electronic device 102 is used for videoconference purposes or when still photos are imaged, it is desirable to know what is level in the reality of the scene. The knowledge can then be used by the apparatus which reproduces the scene to de-rotate the image if a Y axis rotation occurred in the imaging by the handheld electronic device 102. It is particularly useful when real-time images are being sent to the image reproducer, such as during the occurrence of a videoconference, for rotation correction to be identified and corrected.

The image capture device 225 is mounted in the handheld electronic device 102 in a known orientation relative to at least one of the surfaces of the housing 104 of the handheld electronic device 102. In the implementation shown in FIGS. 1A and 1B, the image capture device is mounted so that the image capture device accepts light arriving, for the most part, perpendicularly to the back surface, i.e., perpendicular to both the X and the Z axes and parallel to the Y axis.

A reference direction is needed to specify level—"up"—in the scene being captured. Gravity provides such a reference direction and is measured by the accelerometer 502. In the arrangement depicted in FIG. 1A, the normal up, level, for the captured scene is when the acceleration of gravity vector is measured to be parallel to the Z axis of the handheld electronic device 102 or perpendicular to the X axis. Thus, a rotation about the Y axis (a tilt of the image) is detected by the accelerometer and is calculated in terms of an angle between the vector of the acceleration of gravity and the Z axis (or the X axis, or both) of the handheld electronic device 102.

Resolution of the rotation angle need only be to the nearest 1° for fine-grained correction of the tilt, but other applications can use greater or lesser resolution depending upon the particular requirements of the application.

The angle of rotation is processed by the processor 202 to accompany the image delivered by the image capture device 225 to the processor 202. If the handheld electronic device 102 were placed in a stable dock such that the captured scene would not move once the handheld electronic device 102 is placed in the dock, the rotation angle presumably would not need to be sent to the reproducing device more than once per videoconference session. However, the nature of a handheld electronic device is that it is subject to movement of the user. Therefore, the rotation angle is to be sent more than once to account for the user's movements.

Figure 6:
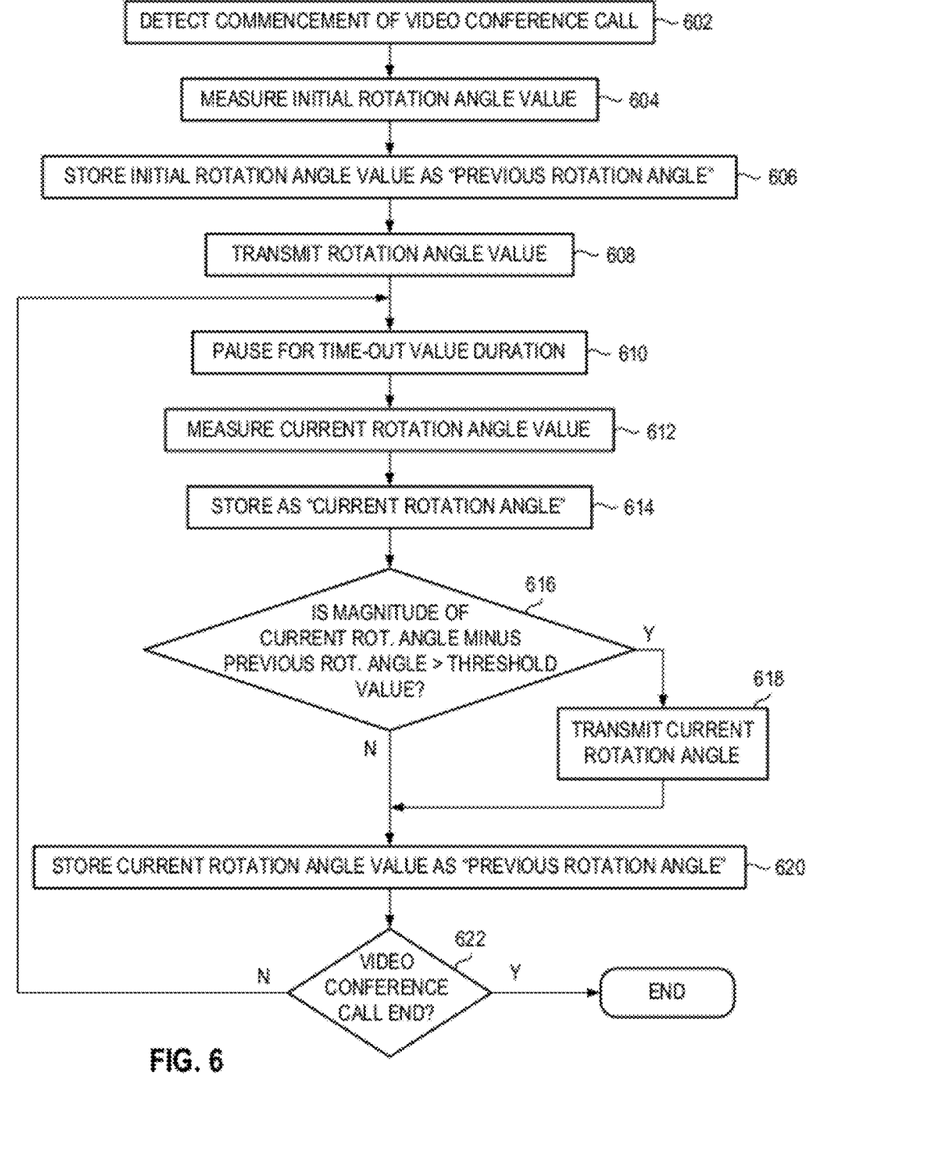
FIG. 6 is a flowchart of a process that may be employed in the handheld electronic communication device of FIG. 2.

When the handheld electronic device 102 is not in a stationary dock, the processor 202 processes the sending of the rotation angle as shown in the flowchart of FIG. 6. A detection of the commencement of a videoconference session is made at 602. The rotation angle value at the initiation of the call is measured from the accelerometer 502 and its signal processing, at 604, and stored in memory as a previous rotation angle value, at 606. The stored previous rotation value is then transmitted, at 608, for example to a receiving handheld electronic device engaged in the videoconference session. The process pauses, at 610, for a time-out that is established according to anticipated motions of the user and the desired amount of radio bandwidth usage for the transmission of the value. One implementation employs a time-out period of two seconds. Following the process pause, the rotation angle is again measured, at 612, and stored as a current rotation angle value, at 614. The absolute value of the difference between the current rotation angle value and the previous rotation angle value is calculated and a determination is made whether a threshold value stored in memory is exceeded by the difference magnitude, at 616. The threshold value, based on an acceptable video quality and desired bandwidth consumption, is established. If the threshold value is exceeded, that is, if a trigger event occurs, the current rotation angle value is transmitted, at 618, and the current rotation angle value is stored over the previous rotation angle value, at 620, for both "yes" and "no" results from the determination step 616. If the videoconference has not ended, as determined at 622, the process returns to the pause step 610, otherwise the process of FIG. 6 ends.

In an alternative implementation, the time-out value of step 610 is set at three seconds and the threshold value test of step 616 is eliminated, thereby transmitting the rotation angle repetitively at the predetermined time-out value. The trigger event is cyclical, based on duration of time. The first implementation, above, saves bandwidth if the transmitting handheld electronic device orientation changes often but uses a more complex protocol. The alternative implementation, above, may be less than optimal for bandwidth resources if orientation changes are slow or nonexistent.

In addition to dedicated videoconference devices and desktop/laptop computers, the handheld electronic device 102 also operates as the reception end of a videoconference. In one implementation, video image, audio, and orientation information is returned from the host system 450, through the network 424 and network node 402, to the receiving handheld electronic device 102. The handheld electronic device 102 receiver 302 provides signal amplification, frequency down conversion, filtering, channel selection, and analog-to-digital (A/D) conversion to the videoconference signal and delivers the signal to DSP 312, which in turn provides the information to processor 202. Without a rotation angle value, a handheld electronic device will display an image on the display 112, 210 that assumes that the transmitting handheld electronic device is oriented correctly in the Z axis and that the scene "up" is the same as the image "top". However, if the transmitting handheld electronic device is, in actuality, rotated about the Y axis, a tilted, non-level, image is presented, as depicted in the display 112 of FIG. 7. Processor 202 accepts the rotation angle value and, through processing similar to that already known to users of Photoshop® and other manual image manipulation software, de-rotates the image by the magnitude of that rotation angle to present an image with a "level" scene corresponding to the "level" at the transmitting end.

Figure 7:
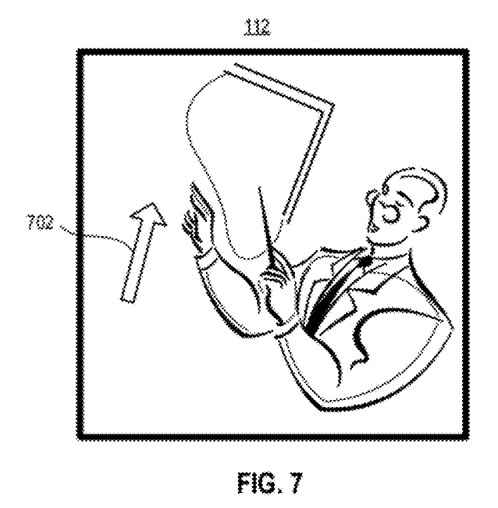
FIG. 7 is a depiction of an image reproduced on the display of the handheld electronic communication device of FIG. 1A and FIG. 2 in which the reproduced image is tilted or rotated by an angle in the clockwise direction.

In an alternative implementation, where automatic image processing is not desired—for example, to reduce power consumption in a handheld electronic device, the processor 202 calculates the parameters of and inserts indicia into the displayed scene, such as depicted in the display 112 of FIG. 7 to indicate the tilt of the scene. Here, the indicium is an arrow 702, by which the user is enabled to manually cause the displayed image to be rotated until the arrow indicium appears to be vertically oriented on the display.

Figure 8:
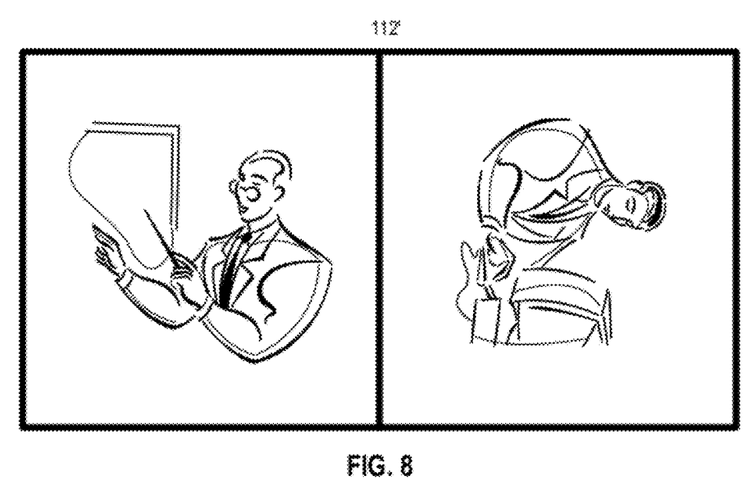
FIG. 8 is a depiction of a split image reproduced on a receiving handheld electronic communication device display, having a rectangular aspect ratio, in which one of the images, representing the video content from a first videoconference participant is correctly oriented and in which the other of the images, representing the video content from a second videoconference participant, is incorrectly oriented.

In a videoconference among handheld electronic devices, which have elongated rectangular aspect ratios for cameras and displays, if one handheld electronic device is in landscape orientation while the other is in portrait orientation as depicted in the display 112' of FIG. 8, and the receiving handheld electronic device automatically orients its own display based on input from an accelerometer, then the displayed image will either be very small, in order to fit on the screen, or else it may be substantially cropped.

As described earlier, some handheld electronic devices offer a rectangular aspect ratio to the display and provide a rectangular aspect ratio image capture from the image capture device 225. If during videoconferencing, the receiving device is a handheld electronic device, and the receiving handheld electronic device is instructed to suspend its automatic display orientation, the display image orientation can be based on the image's dimensions in order to maximize magnification and reduce cropping. For example, if the transmitter is in landscape mode, then the receiving handheld electronic device suspends automatic image orientation and displays the image in landscape mode to best fit its own screen. The display mode will then override any accelerometer input that might orient incoming images in portrait mode. Assuming the incoming image has the same proportions as the display, the display can then be matched to the incoming image aspect ratio, in order to maximize magnification and minimize cropping. For simplistic scenes, as mentioned above, the user of the receiving handheld electronic device can trivially ascertain "up". However, the user of the receiving handheld electronic device cannot ascertain "up" without also identifying an indication that is received from the transmitting phone.

During multi-party videoconferencing, the receiving handheld electronic device suspends its automatic display orientation and displays each of the images based on the respective received orientation. Alternately, the receiving handheld electronic device retains its automatic display orientation for one of the images and modifies the display of the other images based on the respective received orientation. However, when a multiparty videoconference is undertaken, it is possible that one image will be upright in a "portrait" mode, while the other is not—either because the non-upright image is tilted at an angle or because it was image-captured in a "landscape" mode. Processor 202 is programmed to correct received images from multiple sources independently from one another and therefore uses the rotation angle value to rotate the non-upright image by the received rotation angle value for a correct image "level" to be displayed. Alternatively, if a correction of "landscape" to "portrait" is desired, the receiving handheld electronic device suspends the automatic orientation of display to allow the user to manually cause a 90° rotation of the mismatched image. Moreover, the receiver videoconferencing application permits manual orientation of selected received image(s) in a multi-party videoconference call if a handheld electronic device that is not capable of transmitting orientation information is participating in the videoconference. That is, if there are four participants in a call, and one of them does not have a handheld electronic device application capable of transmitting orientation, the received image from that specific handheld device is manually oriented.

Presently preferred implementations of the disclosure and many of improvements and advantages thereof have been described with a degree of particularity. The description is of preferred examples of implementing the disclosure, and the description of examples is not necessarily intended to limit the scope of the disclosure. The scope of the disclosure is defined by the following claims.

The invention claimed is:

1. A handheld communication device disposed in a housing with at least a first surface and having image capturing capability, comprising:
   a processor and associated memory;
   an image capture device disposed in the handheld communication device in a known orientation relative to the housing first surface and providing a first signal representing a scene as a first image to said processor;
   an orientation sensor providing, to said processor, a first orientation value representing a first orientation of the handheld communication device and a second orientation value representing a second orientation of the handheld communication device, the first orientation value provided before the second orientation value;
   wherein said processor receives said first signal from said image capture device and said first orientation value and second orientation value from said orientation sensor, and calculates first and second angles of rotation, the first angle of rotation identifying the difference between said first orientation and said known orientation, the second angle of rotation identifying the difference between said second orientation and said known orientation; and
   a communication subsystem coupled to said processor to wirelessly communicate with a network and transmit said first image and said first angle of rotation and, responsive to differences between the first and second angles of rotation, said second angle of rotation.

2. The handheld communication device of claim 1 wherein said second angle of rotation is transmitted to said network when a trigger event has occurred.

3. The handheld communication device of claim 2 further comprising a threshold value stored in said memory and a comparator to compare a difference between the first and second angles of rotation and to generate said trigger event when said difference is greater than said threshold value.

4. The handheld communication device of claim 2 further comprising a timer for generation of said trigger event at predetermined times.

5. A communication system for conveying sequential images between at least two communication devices, comprising:
   an image generating communication device that generates a first image of a scene, a first angle of rotation and a second angle of rotation, the first angle of rotation generated based on a first orientation value and the second angle of rotation generated based on a second orientation value, the second orientation value being obtained after the first orientation value, the image generating communication device transmitting the first image, the first angle of rotation and, responsive to differences between the first and second angles of rotation, the second angle of rotation;
   a communication network wirelessly coupled to said image generating communication device and receiving said first image, said first angle of rotation and said second angle of rotation;
   an image receiving communication device wirelessly coupled to said communication network and receiving, via the communication network, said first image and said first and second angles of rotation, the image receiving communication device configured to determine, based on the first angle of rotation or the second angle of rotation, the changes needed to de-rotate said first image and to display said first image on a display.

6. The communication system of claim 5 further comprising a processor at said image receiving device wherein said processor inserts an indicium into said first image indicating a tilt of said first image.

7. The communication system of claim 5 further comprising a processor at said image receiving device wherein said processor automatically de-rotates said first image.

8. A method for capturing at least one image in a handheld communication device, comprising:
   generating a signal representing a first image;
   generating a first orientation value representing an orientation of the handheld communication device;
   determining a first angle of rotation for said first image based on the first orientation value;
   wirelessly communicating with a network to transmit said first image and said first angle of rotation;
   generating a second orientation value representing an orientation of the handheld communication device relative to a gravity acceleration vector;
   determining a second angle of rotation based on the second orientation value; and responsive to differences between the first angle of rotation and the second angle of rotation, transmitting the second angle of rotation, the second angle of rotation associated with a second image.

9. The method of claim 8 wherein transmitting the second angle of rotation comprises-communicating said second angle of rotation to said network when a trigger event has occurred.

10. The method of claim 9 further comprising:
recalling an angle of rotation threshold value from a memory;
comparing a difference between the first and second angles of rotation to said angle of rotation threshold value; and
generating said trigger event when said difference is greater than said angle of rotation threshold value.

11. The method of claim 9 further comprising generating said trigger event at predetermined times.

* * * * *